United States Patent
Chowdhury

(10) Patent No.: US 11,386,430 B2
(45) Date of Patent: *Jul. 12, 2022

(54) PROTOCOL TO SECURE ELECTRONIC TRANSACTIONS USING TWO WAY HANDSHAKES

(71) Applicant: Capital One Services, LLC, McLean, VA (US)

(72) Inventor: Animesh Chowdhury, Fairfax Station, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/060,227

(22) Filed: Oct. 1, 2020

(65) Prior Publication Data

US 2021/0150535 A1 May 20, 2021

Related U.S. Application Data

(63) Continuation of application No. 16/683,337, filed on Nov. 14, 2019, now Pat. No. 10,832,244.

(51) Int. Cl.
*G06Q 20/40* (2012.01)
*G06F 21/32* (2013.01)
*G06Q 20/38* (2012.01)

(52) U.S. Cl.
CPC ....... *G06Q 20/40145* (2013.01); *G06F 21/32* (2013.01); *G06Q 20/382* (2013.01); *G06Q 20/388* (2013.01)

(58) Field of Classification Search
USPC .......................................................... 705/44
See application file for complete search history.

(56) References Cited

U.S. PATENT DOCUMENTS 7,181,017 B1 *   2/2007  Nagel ................... H04L 9/0841
                                                380/282
7,246,244 B2 *   7/2007  Nanavati ............... H04L 9/0825
                                                705/51

(Continued)

OTHER PUBLICATIONS

L. Zahrouni, D. Blackwood, S. Rizvi, J. Gualdoni and M. Almiani, "Preventing identity theft using biometrics based authentication system," 2017 IEEE Jordan Conference on Applied Electrical Engineering and Computing Technologies (AEECT), 2017, pp. 1-6, (Biometrics). (Year: 2017).*

(Continued)

*Primary Examiner* — Chikaodinaka Ojiaku
(74) *Attorney, Agent, or Firm* — Banner & Witcoff, Ltd.

(57) ABSTRACT

Methods and systems as described herein may secure the electronic transfer of assets using two-way handshakes. A second device may initialize a transaction by transmitting a transaction request and a second biometric identifier to a first device. The first device may receive the transaction request and review the second biometric identifier. When the first device recognizes the second biometric identifier, the second biometric identifier may be approved. The first device then transmits a response, that includes a first biometric identifier, to the second device, via a server that may record the first device's approval. The second device may confirm the identity of the first device using the first biometric identifier. When the second device approves the first biometric identifier, the second device may transmit an approval to the server. After the server has received approval of both biometric identifiers, the server may execute the requested transaction.

24 Claims, 10 Drawing Sheets

(56) References Cited

U.S. PATENT DOCUMENTS

| | | | | |
|---|---|---|---|---|
| 7,933,835 | B2* | 4/2011 | Keane | G06Q 20/40145 |
| | | | | 705/79 |
| 8,316,237 | B1* | 11/2012 | Felsher | H04L 9/3249 |
| | | | | 380/282 |
| 8,386,393 | B2* | 2/2013 | Michelsen | G06Q 20/10 |
| | | | | 705/64 |
| 8,678,273 | B2 | 3/2014 | McNeal | |
| 9,990,628 | B2* | 6/2018 | Giobbi | G06F 21/32 |
| 10,154,029 | B1* | 12/2018 | Griffin | H04L 9/0866 |
| 2002/0013767 | A1* | 1/2002 | Katz | G06Q 40/02 |
| | | | | 705/39 |
| 2002/0029194 | A1* | 3/2002 | Lewis | G06Q 20/10 |
| | | | | 705/40 |
| 2003/0070080 | A1 | 4/2003 | Rosen | |
| 2003/0093367 | A1* | 5/2003 | Allen-Rouman | G06Q 20/10 |
| | | | | 705/40 |
| 2004/0127277 | A1* | 7/2004 | Walker | H04L 63/08 |
| | | | | 463/16 |
| 2005/0119968 | A1* | 6/2005 | Michelsen | G06Q 20/10 |
| | | | | 705/39 |
| 2005/0251688 | A1* | 11/2005 | Nanavati | H04L 9/321 |
| | | | | 713/186 |
| 2006/0167784 | A1* | 7/2006 | Hoffberg | G06Q 50/188 |
| | | | | 705/37 |
| 2007/0087756 | A1* | 4/2007 | Hoffberg | G06Q 20/065 |
| | | | | 455/450 |
| 2007/0174186 | A1* | 7/2007 | Hokland | G06Q 20/02 |
| | | | | 705/39 |
| 2007/0244809 | A1* | 10/2007 | Meeks | G06Q 20/26 |
| | | | | 705/39 |
| 2008/0082451 | A1* | 4/2008 | Schneider | G06Q 20/12 |
| | | | | 705/64 |
| 2008/0156866 | A1* | 7/2008 | McNeal | G06Q 20/40 |
| | | | | 235/379 |
| 2008/0172342 | A1* | 7/2008 | Keane | G06Q 20/02 |
| | | | | 705/76 |
| 2010/0317420 | A1* | 12/2010 | Hoffberg | G06Q 30/0207 |
| | | | | 463/1 |
| 2013/0002401 | A1* | 1/2013 | Tibor | G06V 40/12 |
| | | | | 340/5.82 |
| 2013/0060708 | A1* | 3/2013 | Oskolkov | G06Q 20/10 |
| | | | | 705/42 |
| 2013/0297514 | A1* | 11/2013 | Giobbi | G06Q 20/40145 |
| | | | | 705/71 |
| 2014/0067661 | A1* | 3/2014 | Elischer | G06Q 20/401 |
| | | | | 705/39 |
| 2014/0172707 | A1* | 6/2014 | Kuntagod | G06Q 20/3224 |
| | | | | 705/44 |
| 2015/0095238 | A1* | 4/2015 | Khan | G06Q 20/3823 |
| | | | | 705/71 |
| 2016/0054962 | A1* | 2/2016 | Park | H04W 4/80 |
| | | | | 358/1.15 |
| 2016/0119143 | A1* | 4/2016 | Fang | H04L 9/3247 |
| | | | | 713/186 |
| 2016/0210635 | A1* | 7/2016 | Alyeshmerni | G06Q 20/322 |
| 2016/0358296 | A1* | 12/2016 | Chung | G06V 40/19 |

OTHER PUBLICATIONS

T. Pering, J. Light, M. Sundar and R. Want, "Photographic Authentication through Untrusted Terminals" in IEEE Pervasive Computing, vol. 2, No. 01, pp. 30-36, 2003.(Untrusted Terminals). (Year: 2003).*

Vital Signs of Identity, B. Miller et all, EEE Spectrum (vol. 31, Issue: 2, pp. 22-30) (Visual). (Year: 1994).

T. Pering, M. Sundar, J. Light and R. Want, "Photographic authentication through untrusted terminals," in IEEE Pervasive Computing, vol. 2, No. 1, pp. 30-36, Jan.-Mar. 2003 (Security) (Year: 2003).

* cited by examiner

100

PROTOCOL TO SECURE ELECTRONIC TRANSACTIONS USING TWO WAY HANDSHAKES

CROSS REFERENCE TO RELATED APPLICATIONS

This application is a continuation of co-pending application U.S. application Ser. No. 16/683,337, filed on Nov. 14, 2019 and entitled "Protocol to Secure Electronic Transactions Using Two Way Handshakes," the entirety of which is hereby incorporated in its entirety by reference.

FIELD OF USE

Aspects of the disclosure relate generally to secure transactions and more specifically to a protocol to secure electronic transactions using two-way handshakes.

BACKGROUND

Scams, and various types of fraud, to obtain money from users are well-known. From the Nigerian Prince email scam to phishing attempts, various efforts are made to obtain money or sensitive information from users. In this regard, existing solutions provide inadequate protection for users. For example, users may set up alerts and notifications; however, most alerts and notifications may be triggered by spending limits, not fraudulent attempts to obtain the users money. Another example may be fraud detection systems employed by banks and other lending institutions. These may catch valid attempts to transfer money, which may, in turn, annoy users. Lastly, users may configure secure sign-in to require multifactor authentication, such as a password and either a biometric or one-time code. While this may protect the users' accounts, secure sign-in techniques do little to protect a user from transferring money to a scammer.

Aspects described herein may address these and other problems, and generally improve the speed, efficiency, and security of electronic asset transfers.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below. Corresponding apparatus, systems, and computer-readable media are also within the scope of the disclosure.

Methods and systems as described herein may secure the electronic transfer of assets using two-way handshakes. When a second user initializes a transaction with a first user, the second user may capture a second biometric identifier to send along with the transaction request transmitted to the first user device. The first user device may receive the transaction request and the first user may review the second biometric identifier. If the first user does not approve of the second biometric identifier, the first user device may terminate the transaction. However, when the first user recognizes the second user from the second biometric identifier and approves the second biometric identifier, the first user device may confirm the identity of the second user, obtain a first biometric identifier, and transmit a response to the second user device via a server. The response may include the confirmation of the second user's identity and the first biometric identifier. Further, the server may record the first user device's approval of the second biometric identifier.

Upon receiving the response from the first user device, the second user device may present the first biometric identifier received in the first user's response for the second user to confirm the identity of the first user. The second user device may not approve the first biometric identifier and the transaction may be terminated. When the second user identifies the first user from the first biometric and approves the first biometric identifier, the second user device may transmit a verification to the server. After the server has received approval of each parties' respective biometric identifier, the server may initiate the electronic transfer between the two parties.

By having both parties approve a biometric identifier of the other party before initiating a transfer of assets from one account to another, the techniques described herein may improve security of electronic asset transfers and prevent scammers from fraudulently obtaining assets from users.

These features, along with many others, are discussed in greater detail below.

BRIEF DESCRIPTION OF THE DRAWINGS

The present disclosure is described by way of example and not limited in the accompanying figures in which like reference numerals indicate similar elements and in which.

DETAILED DESCRIPTION

Figure 1:
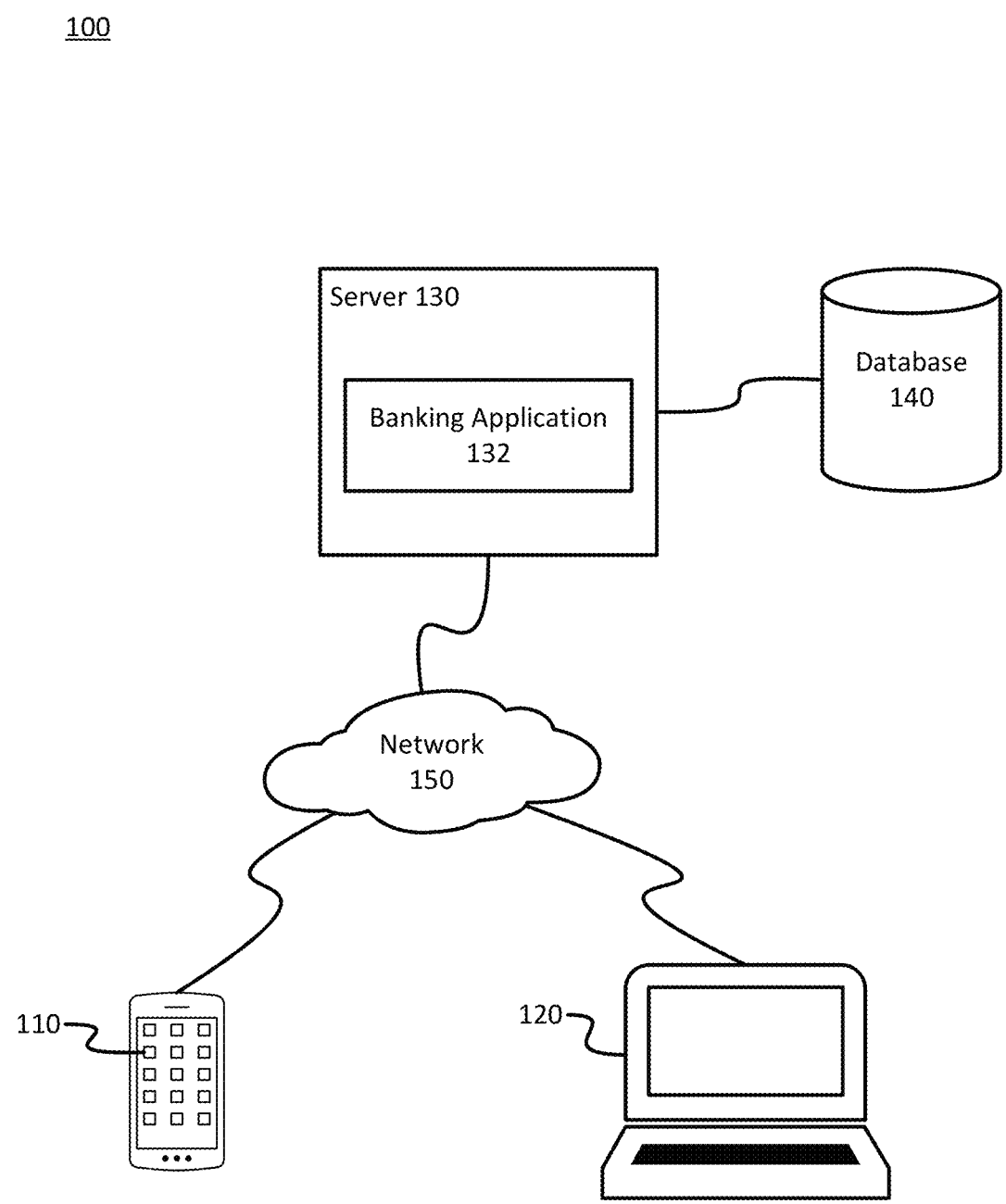
FIG. 1 shows an example of a control processing system in which one or more aspects described herein may be implemented.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein may relate to methods and techniques for securing electronic transactions using two-way handshakes. As discussed above, very little has been done to protect users when performing electronic transfers of assets. In this regard, alerts and notifications may be employed, but these typically only alert a user in response to various triggers (i.e., spending limits) configured by the user. Secure sign-in may prevent malicious users from accessing an account, but does little in the way of protecting users from transferring assets to bad actors. Finally, overzealous fraud detection systems may flag and prevent legitimate transactions from being performed in a timely manner. Thus, there is a need to verify the person on the other side of an electronic transaction before the transaction commences to ensure that users are not being scammed.

Methods and systems as described herein may secure the electronic transfer of assets using two-way handshakes. A second user may initialize a transaction with a first user by transmitting a transaction request and a recently obtained second biometric identifier to the first user device. The first user device may receive the transaction request and present the second biometric identifier for the first user's review. When the first user does not recognize the second user from the second biometric identifier, the first user device may deny the second biometric identifier and terminate the transaction. If the first user recognizes the second user from the second biometric identifier, the second biometric identifier may be approved by the first user device. The first user device may then obtain a first biometric identifier and transmit a response to the second user device via a server. The response may include the confirmation of the second user's identity and the first biometric identifier. Additionally, the server may record the first user device's approval of the second biometric identifier.

After receiving a response from the first user device, the second user device may present the first biometric identifier for the second user to review. If the second user does not recognize the first user from the first biometric identifier, the second user device may reject the first biometric identifier. Accordingly, the transaction may be terminated. However, when the second user recognizes the first user from the first biometric, the first biometric identifier may be approved. The second user device may then transmit a verification of the first biometric identifier to the server. Once the server has received approval from both devices, the server may initiate the electronic transfer of assets between the two parties. By approving a biometric identifier of a transacting party prior to initiating the transfer of assets may improve security and prevent scammers from fraudulently obtaining assets from users.

Turning to FIG. 1, a system 100 is shown that includes a first user device 110, a second user device 120, and a server 130, connected to a first database 140, interconnected via network 150.

First user device 110 may be a mobile device, such as a cellular phone, a mobile phone, a smart phone, a tablet, or a laptop. First user device 110 may provide a first user with access to various applications and services. For example, first user device 110 may provide the first user with access to the Internet. Additionally, first user device 110 may provide the first user with one or more applications ("apps") located thereon. The one or more applications may provide the first user with a plurality of tools and access to a variety of services. In some embodiments, the one or more applications may include a banking application that provides access to the first user's banking information, as well as perform routine banking functions, such as checking the first user's balance, paying bills, transferring money between accounts, withdrawing money from an automated teller machine (ATM), and wire transfers. In other embodiments, the one or more applications may be a digital, or electronic, wallet that is part of a payment service.

Second user device 120 may be a computing device configured to allow a user to execute software for a variety of purposes. Second user device 120 may belong to the first user that accesses first user device 110, or, alternatively, second user device 120 may belong to a second user, different from the first user. Second user device 120 may be a desktop computer, laptop computer, or, alternatively, a virtual computer. The software of second user device 120 may include one or more web browsers that provide access to websites on the Internet. These websites may include banking websites that allow the user to access his/her banking information and perform routine banking functions. In some embodiments, second user device 120 may include a banking application that allows the user to access his/her banking information and perform routine banking functions. In other embodiments, second user device 120 may include a digital wallet that is part of a payment service, such as Venmo®.

Server 130 may be any server capable of executing banking application 132. Additionally, server 130 may be communicatively coupled to first database 140. In this regard, server 130 may be a stand-alone server, a corporate server, or a server located in a server farm or cloud-computer environment. According to some examples, server 130 may be a virtual server hosted on hardware capable of supporting a plurality of virtual servers.

Banking application 132 may be server-based software configured to provide users with access to their account information and perform routing banking functions. In some embodiments, banking application 132 may be the server-based software that corresponds to the client-based software executing on first user device 110 and second user device 120. Additionally, or alternatively, banking application 132 may provide users access to their account information through a website accessed by first user device 110 or second user device 120 via network 160. While application 132 has been described in the context of a banking application, it will be appreciated that application 132 may be any application capable of facilitating an electronic transaction between a first party and a second party. For example, application 132 may be a wire transfer service, a payment service (e.g., Venmo®), an escrow service, or the like. Similarly, the electronic transaction may include wire transfers, as well as bill pay, escrow transactions, cryptocurrency transfers, cryptocurrency exchanges, money transfers, and the like. In this regard, server 130 and banking application 132 may be a trusted third party to facilitate the transfer of assets and, if necessary, hold the assets in escrow. Assets may include money, cryptocurrency, stocks, options, bonds, mutual funds, ETFs, or anything with an economic value.

First database 140 may be configured to store information on behalf of application 132. The information may include, but is not limited to, personal information, account information, and user-preferences. Personal information may include a user's name, address, phone number (i.e, mobile number, home number, business number, etc.), social security number, username, password, employment information, family information, and any other information that may be used to identify the first user. Account information may include account balances, bill pay information, direct deposit information, wire transfer information, statements, and the like. User-preferences may define how users receive notifications and alerts, spending notifications, and the like. First database 140 may include, but are not limited to relational databases, hierarchical databases, distributed databases, in-memory databases, flat file databases, XML databases, NoSQL databases, graph databases, and/or a combination thereof.

First network 150 may include any type of network. In this regard, first network 150 may include the Internet, a local area network (LAN), a wide area network (WAN), a wireless telecommunications network, and/or any other communication network or combination thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computing devices described herein may be configured to communicate using any of these network protocols or technologies. The data transferred to and from various computing devices in system 100 may include secure and sensitive data, such as confidential documents, customer personally identifiable information, and account data. Therefore, it may be desirable to protect transmissions of such data using secure network protocols and encryption, and/or to protect the integrity of the data when stored on the various computing devices. For example, a file-based integration scheme or a service-based integration scheme may be utilized for transmitting data between the various computing devices. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computing devices. Web services may be accessed by authorized external devices and users to support input, extraction, and manipulation of data between the various computing devices in the system 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computing devices. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in system 100 in front of one or more computing devices such that any external devices may communicate directly with the specialized hardware.

Figure 2:
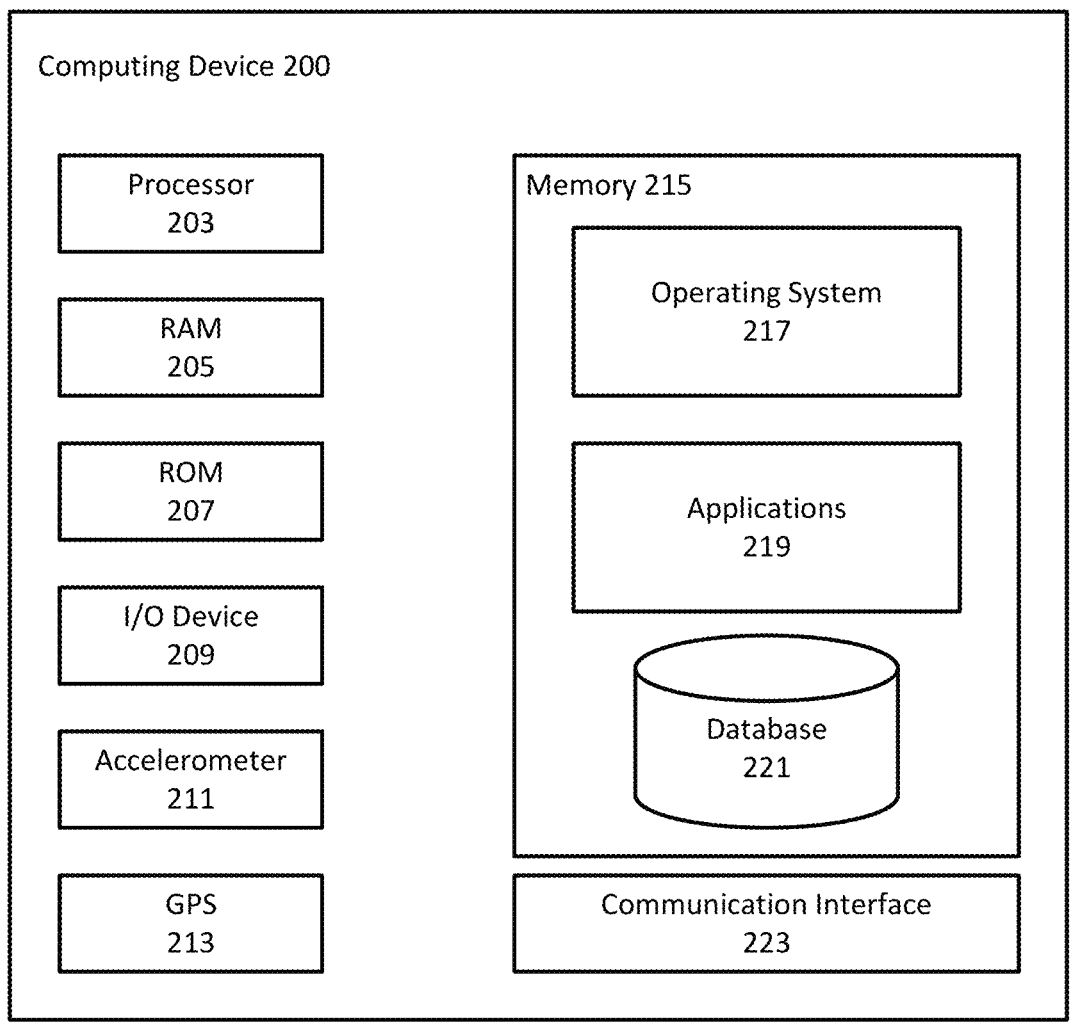
FIG. 2 shows an example computing device in accordance with one or more aspects described herein.

Any of the devices and systems described herein may be implemented, in whole or in part, using one or more computing systems described with respect to FIG. 2. Turning now to FIG. 2, a computing device 200 that may be used with one or more of the computational systems is described.

The computing device 200 may include a processor 203 for controlling overall operation of the computing device 200 and its associated components, including RAM 205, ROM 207, input/output device 209, accelerometer 211, global-position system antenna 213, memory 215, and/or communication interface 223. A data bus may interconnect processor(s) 203, RAM 205, ROM 207, memory 215, I/O device 209, accelerometer 211, global-position system receiver/antenna 213, memory 215, and/or communication interface 223. In some embodiments, computing device 200 may represent, be incorporated in, and/or include various devices such as a desktop computer, a computer server, a mobile device, such as a laptop computer, a tablet computer, a smart phone, any other types of mobile computing devices, and the like, and/or any other type of data processing device.

Input/output (I/O) device 209 may include a microphone, keypad, touch screen, and/or stylus through which a user of the computing device 200 may provide input, and may also include one or more of a speaker for providing audio output and a video display device for providing textual, audiovisual, and/or graphical output. Software may be stored within memory 215 to provide instructions to processor 203 allowing computing device 200 to perform various actions. For example, memory 215 may store software used by the computing device 200, such as an operating system 217, application programs 219, and/or an associated internal database 221. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Accelerometer 211 may be a sensor configured to measure accelerating forces of computing device 200. Accelerometer 211 may be an electromechanical device. Accelerometer may be used to measure the tilting motion and/or orientation computing device 200, movement of computing device 200, and/or vibrations of computing device 200. The acceleration forces may be transmitted to the processor to process the acceleration forces and determine the state of computing device 200.

GPS receiver/antenna 213 may be configured to receive one or more signals from one or more global positioning satellites to determine a geographic location of computing device 200. The geographic location provided by GPS receiver/antenna 213 may be used for navigation, tracking, and positioning applications. In this regard, the geographic may also include places and routes frequented by the first user. In the context of a banking application, GPS receiver/antenna 213 may be used to locate one or more banking locations.

Communication interface 223 may include one or more transceivers, digital signal processors, and/or additional circuitry and software for communicating via any network, wired or wireless, using any protocol as described herein.

Processor 203 may include a single central processing unit (CPU), which may be a single-core or multi-core processor, or may include multiple CPUs. Processor(s) 203 and associated components may allow the computing device 200 to execute a series of computer-readable instructions to perform some or all of the processes described herein. Although not shown in FIG. 2, various elements within memory 215 or other components in computing device 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing device 200 are described separately, functionality of the various components may be combined and/or performed by a single component and/or multiple computing devices in communication without departing from the invention.

Figure 3:
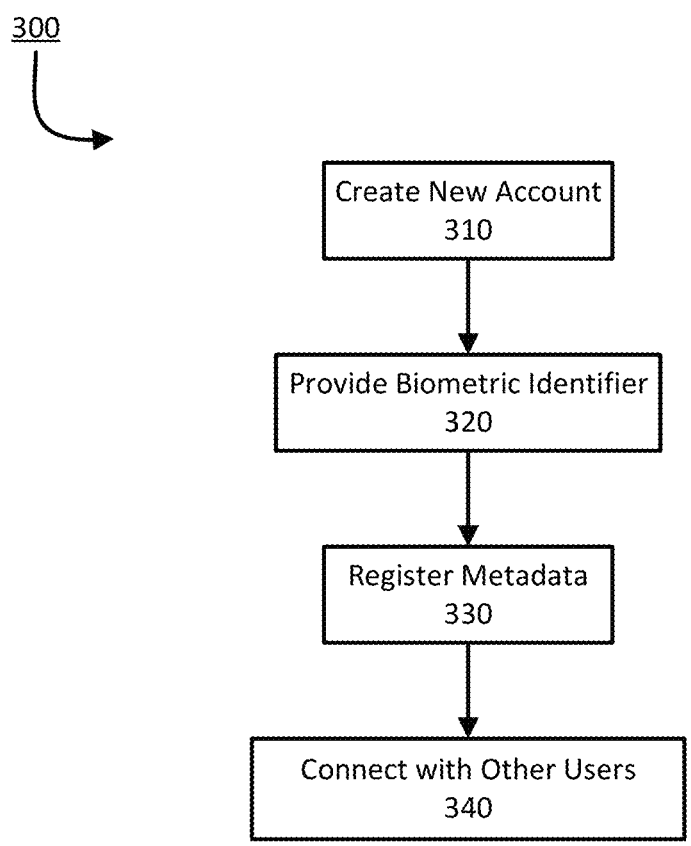
FIG. 3 shows a flow chart of a process for creating a new account with an electronic asset transfer service according to one or more aspects of the disclosure.

Electronic transaction services, such as a bank, a payment service, or the like, may have users register before accessing the services provided by the electronic transaction service. FIG. 3 shows a flow chart of a process for creating a new account with an electronic transaction service according to one or more aspects of the disclosure. Some or all of the steps of process 300 may be performed using one or more of the computing devices described herein.

Process 300 begins in block 310 with a request to create a new account. In embodiments where the electronic transfer is performed via an application, the request to create a new account may occur after a user has downloaded and installed on his/her device. In these instances, the home screen may prompt the user to create a new account or login to an existing account. In embodiments where the electronic transfer is performed via a website, the request to create a new account may be provided as a link on a homepage.

Once the user has initiated the registration process, the user may be prompted to provide registration information. The registration information may include a username, a password, the name of the user (i.e., first name, last name), contact information (e.g., mobile phone number, email address), and the like. Additionally, registration information may also include linking a bank account to the service or making an initial deposit. In some embodiments, the registration process may be initiated on behalf of a corporate entity. The user that initiates the registration on behalf of the corporate entity may have authority to transact on behalf of the corporate entity. In this regard, the user that is authorized to transact on behalf of the corporate entity may create a username and password and provide his/her registration information. However, instead of linking his/her banking information to the service, the user may link the corporate entity's banking information to the service. Alternatively, or additionally, the user that initiates the registration process on behalf of a corporate entity may delegate transaction privileges to one or more second users. The service may provide the one or more second users with an email, a text message, or another notification that prompts the one or more second users to register for the electronic asset transfer service.

In block 320, the user may provide one or more biometric identifiers as part of the registration process. Biometric identifiers may include, but are not limited to, a profile image (for facial recognition), a voice print, a fingerprint, a retina scan, or a physical signature, either scanned or obtained via a touchscreen. In this regard, providing one or more biometric identifiers may activate an image capture device on the user's device to obtain the profile image, fingerprint, retina scan, or physical signature. Similarly, one or more sound capture devices may be activated to obtain the user's voice print.

In block 330, the user may register metadata associated with his/her account. The metadata may include a hardware identifier, a software identifier, a device fingerprint, an internet address (i.e. IP address), a geo-location, or the like of the device that the user may use to access the electronic asset transfer service. The device fingerprint may be obtained by combining one or more hardware components, one or more software components, one or more firmware components, or any combination therefor. In some embodiments, the device fingerprint may be generated by hashing a combination of one or more hardware components, one or more software components, one or more firmware components. The geo-location may be a latitude-longitude, geographical region, a time zone, country, or the like.

The server-side may receive the user's registration information, the one or more biometric identifiers, and the metadata; create an account for the user; and store the information as account information. For example, the account information may be stored in a database. The account information may be cross-referenced to help the user connect with one or more second users via the electronic transaction service. In block 340, the user may connect with other users via the electronic transaction service. In this regard, an application may access the user's address book, contact list, or any combination thereof to obtain the email addresses and/or phone numbers of the user's friends, acquaintances, and contacts. The email addresses and/or phone numbers may be transmitted to the server, which may compare the received email addresses and/or phone numbers to the records of one or more second users in the database to determine whether the user has any connections that use the electronic asset transfer service. If the user has any connections on the electronic transaction service, the server may provide a notification of which email addresses and/or phone numbers were a match so the user can connect with one or more second users. In some embodiments, one or more second users with matching email addresses and/or phone numbers may be automatically added to the user application's contact list. Additionally, or alternatively, the user may be prompted to invite other users to the electronic asset transfer service.

Figure 4:
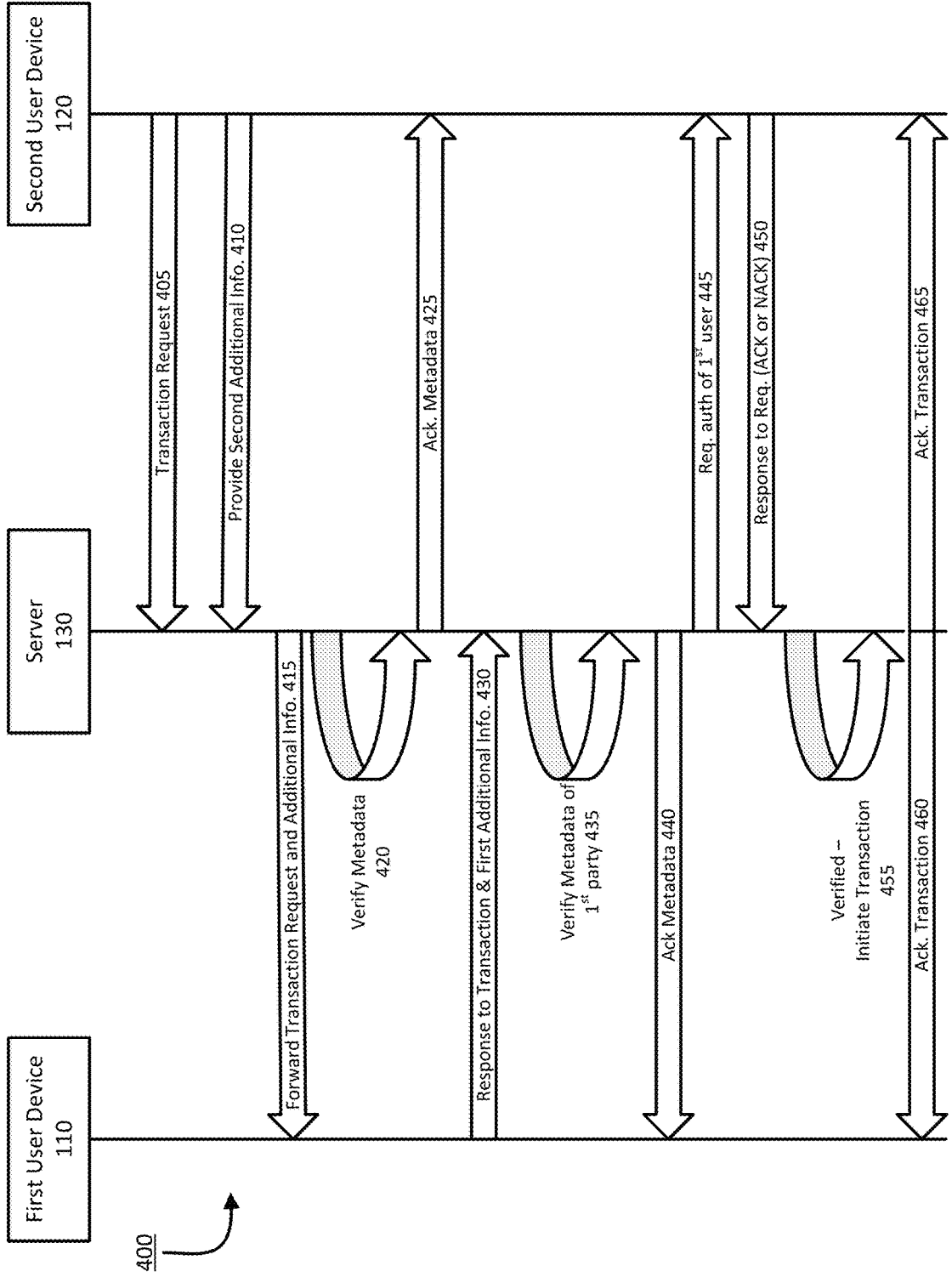
FIG. 4 shows a flowchart of a process for transferring assets using two-way handshakes according to one or more aspects of the disclosure.

Once users have registered and located their friends, acquaintances, and contacts, the users may begin conducting transactions. As noted above, transactions may include wire transfers, money transfers, bill pay, escrow transactions, cryptocurrency transfers, cryptocurrency exchanges, and the like. FIG. 4 shows a flowchart of a process 400 for transferring assets using two-way handshakes according to one or more aspects of the disclosure. Some or all of the steps of process 400 may be performed using one or more computing devices as described herein.

In step 405, second user device 120 may transmit a transaction request to server 130. In this regard, a second user of second user device 120 may access the electronic transaction service via an application on his/her device or via a website. The transaction may request money from a first user. Alternatively, the transaction may be to send money to the first user. For the purposes of this disclosure, the examples described herein relate to requesting money from the first user; however, it will be appreciated that the examples described herein may apply to sending money to the first user. In some embodiments, server 130 may generate a unique transaction identifier for the transaction and send the unique transaction identifier to second user device 120. Both the first user device and second user device 120 may include the unique transaction identifier in transmissions to server 130 and/or each other.

In step 410, secure user device may provide second additional information to server 130. The second additional information may include, for example, a second biometric identifier of the second user, second metadata of second device 120, and an invoice, or some other type of artifact, to establish that the first user owes the second user. In some embodiments, the invoice, or artifact, that may include a digital signature. The second biometric identifier may be obtained in response to the second user initiating the transaction. In this regard, the second biometric identifier may be associated with a timestamp. As will be discussed in greater detail below, the timestamp associated with the second biometric identifier may be used to prove that a malicious user is not using a stored image of the second user to bypass the authentication protocol. Further, second metadata may include a device fingerprint, an internet address (i.e. IP address), a geo-location, or any combination thereof of second device 120. The second additional information may be provided by the second user after being prompted by the server in response to receiving the second user's transaction request. Alternatively, the second additional information may be provided to server 130 at the time the transaction request is made. In this regard, steps 405 and 410 may occur concurrently or, alternatively, may be performed in a single step. In some embodiments, the transaction request and the second additional information may be transmitted over a secure communication channel, such as one secured via SSL or TLS.

In step 415, server 130 may forward the transaction request and the second additional information to the first user device. Forwarding the transaction request may include providing a push notification to the first user device 110. The push notification may indicate the nature of the transaction. For instance, a push notification may be sent to first user device 110 indicating that the second user has request that the first user pay the second user a sum of money. Alternatively, or additionally, forwarding the transaction request may include sending the first user device an email notification or a text notification. In some embodiments, the first user device may receive a push notification, an email notification, and a text notification. The second additional information may also be forwarded to the first user device in step 415. In some embodiments, the second additional information may include the second biometric identifier, metadata of second device 120, the invoice, and the unique transaction identifier generated by server 130. Alternatively, the second additional information forwarded to first user device 110 may include a subset of the additional information. For example, server 130 may forward the second biometric identifier, the invoice, and the unique transaction identifier to first user device 110. In another example, server 130 may send the second biometric identifier and the unique identifier to first user device 110. As will be discussed in greater detail, the second biometric identifier may be used to verify the transaction. That is, the first user may authenticate the second user via the second biometric identifier, thereby reducing the risk that the first user is being scammed out of money from someone they do not know.

In step 420, server 130 may verify the metadata of second user device 120. In this regard, server 130 may compare second metadata received with the second additional information in step 410 to first metadata that the second user registered when creating his/her account for the electronic transaction service. For example, server 130 may compare a second device fingerprint received in step 410 with a first device fingerprint received when the second user created his/her account. Additionally, or alternatively, server 130 may verify the digital signature included with the invoice. When the second metadata and/or digital signature are verified, server 130 may transmit an acknowledgement to the second user device in step 425. When the second metadata and/or digital signature are not valid, server 130 may terminate the transaction. Server 130 may notify first user device 110, second user device 120, or any combination thereof that the transaction has been terminated. In some embodiments, server 130 may provide the reasons why the transaction has been terminated.

In further embodiments, server 130 may verify the second biometric identifier received from second user device 120 in step 420. In this regard, server 130 may compare the second biometric identifier received in step 410 with the first biometric identifier the second user provided when creating his/her account. When the received second biometric identifier matches the first biometric identifier the second user provided when creating his/her account, the transaction may be allowed to proceed. However, when the received second biometric identifier does not match the first biometric identifier, server 130 may terminate the transaction. In some embodiments, server 130 may notify the devices as to the reasons the transaction was terminated.

Verifying the metadata at server 130 may provide an additional layer of security in the event that a user's account was compromised. In this regard, if a user's account is accessed from a device, a geo-location, or an IP address that is atypical, this may be indicative of the user's account (i.e. username and password) having been compromised. For example, if a user typically accesses their account from a Washington, D.C.-based geo-location, requests made from Lagos, Nigeria may indicate that the user's username and password have been compromised.

Similarly, verifying biometric data at server 130 may provide further security against a user's device being compromised. In this regard, if a user's device was stolen, a malicious user may request money from the account of the user of the stolen device and approve the transaction on the stolen device. Incorporating authentication of the second biometric identifier may prevent a malicious user from bypassing the security protocols to initiate an electronic transfer. Furthermore, including a timestamp with the second biometric identifier to ensure that the second biometric identifier is fresh may further prevent a malicious user scamming money from friends of the second user by using an old, or publicly-accessible, photo.

In step 430, first user device 110 may transmit a response to the transaction request to server 130. The response may include an indication of whether the first user recognized the second biometric identifier. If the first user did not recognize the second biometric identifier, the response may include a denial and the transaction may be terminated. However, if the first user did recognize the second biometric identifier, first user device 110 may transmit an acknowledgement or confirmation of the identity of the second user. Additionally, first user device 110 may provide first additional information of the first user in step 430. Similar to the discussion above, first additional information may include a first biometric identifier of the first user, first metadata of first user device 110, and the unique transaction identifier. As discussed above, the first biometric identifier may be captured by first user device 110 and associated with a first timestamp to ensure that a malicious user is not trying to circumvent the safeguards put in place to reduce the likelihood of a scammer obtaining money illicitly by relying on an old, or publicly-accessible, photo. In some embodiments, the response may include an indication of whether the of the invoice was valid. If the digital signature of the invoice was invalid, the response may indicate verification of the signature failed and the transaction may terminate. If the signature of the invoice was valid, an indication may be provided in the transmitted response.

In step 435, server 130 may verify the first metadata of first user device 110. As noted above, server 130 may compare first metadata received with the first additional information in step 430 to metadata that the first user registered when creating his/her account. When the first metadata is verified, server 130 may transmit an acknowledgement to first user device 110 in step 440. When the metadata is not valid, server 130 may terminate the transaction. In some embodiments, server 130 may verify the first biometric identifier received from first user device 110 in step 430 as discussed above.

In step 445, server 130 may forward the first biometric identifier to second user device 120. In this regard, server 130 may request that second user device 120 authenticate the identity of the first user. The second user device may present the first biometric identifier to the second user for the second user to confirm the identity of the first user. In step 450, second user device 120 may transmit a response to the authentication request. The response may include an indication of whether the second user approved the first biometric identifier. If the second user did not confirm the first biometric identifier, the response may include a denial and the transaction may be terminated. However, if the second user did confirm the first biometric identifier, second user device 110 may transmit an acknowledgement or confirmation of the identity of the first user. After the parties have confirmed the identity of the other party, server 130 may initiate the transfer of funds in step 455. In step 460, server 130 may transmit an acknowledgment that the electronic transfer has been initialized. Similarly, server 130 may also transmit an acknowledgment that the electronic transfer has begun in step 465. When the transfer of funds is completed, server 130 may provide notification to first user device 110 and second user device 120 that the transaction was completed successfully.

Figure 5:
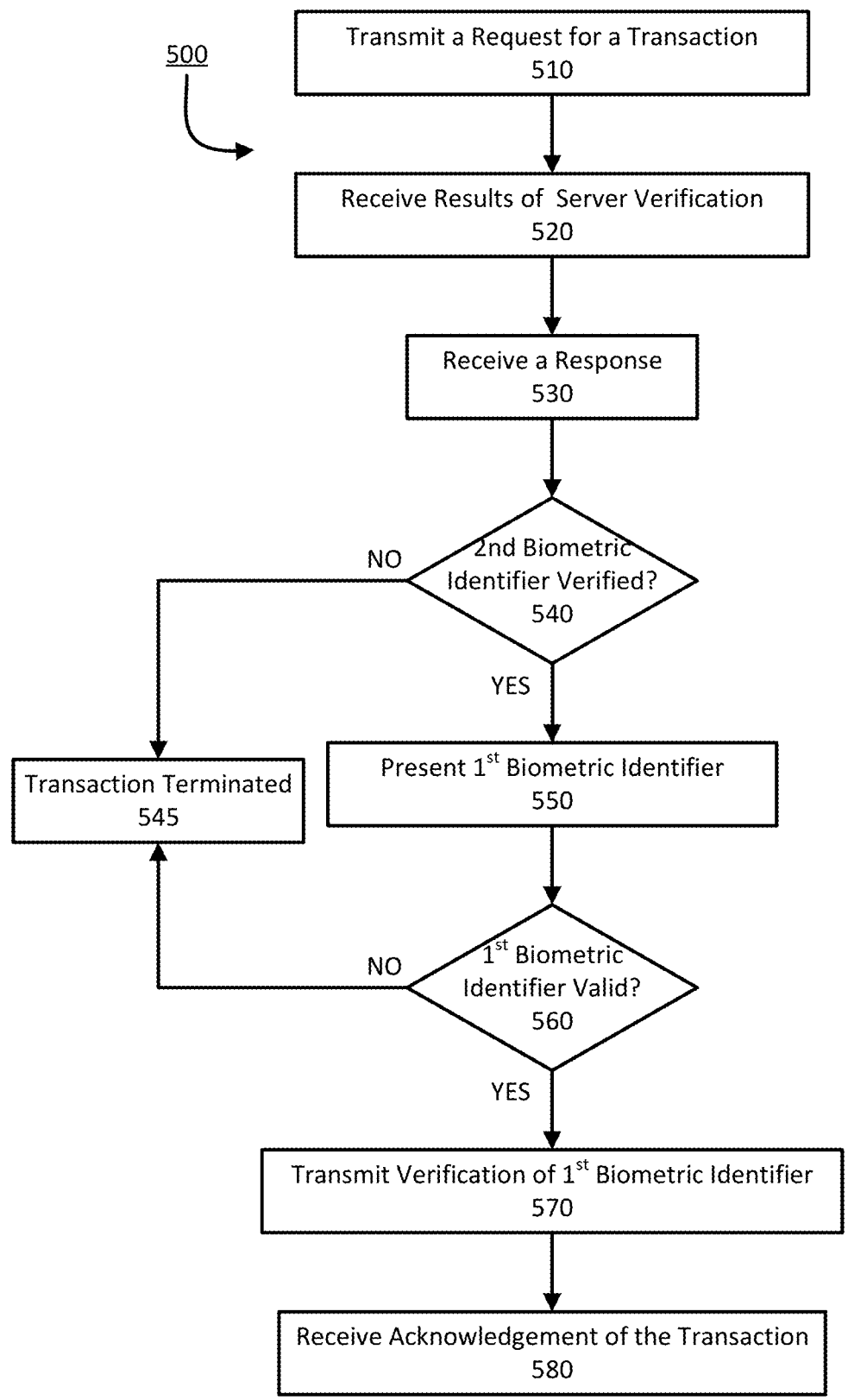
FIG. 5 shows a flow chart of a process for a second user device initiating a transaction and confirm the identity of a first user according to one or more aspects of the disclosure.

The secure transaction, and the two-way handshake to authenticate the secure transaction, may begin with a second user initiating a transaction with a first user. Once the transaction is initiated, the second user may have to confirm the identity of the first user before the transfer is initiated. FIG. 5 shows a flow chart of a process 500 for a second user to initiate a transaction and confirm the identity of a first user according to one or more aspects of the disclosure.

Process 500 begins in block 510 with the second user device transmitting a request for a transaction. As noted above, the request may be transmitted to server 130, which may, in turn, forward the request to the first user device. The transaction may be a request for a first user to transfer assets to a second user. Alternatively, the request may be for the second user to send money to the first user. The request may be transmitted either through an application located on the second user device or via a website. In some embodiments, the request may include the second additional information discussed above.

In block 520, second user device 120 may receive results of the server verification. In some embodiments, server 130 may authenticate second metadata, the second biometric identifier, or both. As noted above, these provide an additional facet to the authentication process. For example, validating the second metadata may mitigate against the second user's account being accessed by a malicious user. Additionally, verifying the second biometric identifier may provide a safeguard against a malicious user who is in possession of both first user device 110 and second user device 120.

In block 530, second user device 120 may receive a response from first user device 110. The response may include a first biometric identifier, a verification result of the second biometric identifier, first metadata of first user device 110, and the unique transaction identifier. In block 540, second user device 120 determines whether the second biometric identifier was verified by a first user of first user device 110. If the first user denied the second biometric identifier, the transaction may be terminated in block 545. In this regard, the second user may initiate another transaction request using the techniques described above. However, when the first user has verified the second biometric identifier, process 500 may proceed to block 550 with second user device 120 presenting the first biometric identifier to the second user. Presenting the first biometric identifier may include displaying a recent photograph of the first user or displaying a short video the first user made in response to receiving the request. Alternatively, presenting the first biometric identifier may include playing an audio file of the first user. In some embodiments, the first biometric identifier may be displayed with options that allow the second user to confirm or deny the first biometric identifier.

In block 560, second user device 120 may determine whether the first biometric identifier is valid. Determining whether the first biometric identifier is valid may include receiving confirmation via an input from the second user. When the first biometric identifier is not valid, process 500 may proceed to block 545 with the transaction being terminated. However, when the first biometric is valid, second user device 120 may transmit a verification of the first biometric identifier to server 130. The verification may comprise an acknowledgement, or validation, that the second user confirms the identity of the first user via the received first biometric identifier. In block 580, second user device 120 may receive an acknowledgment with respect to the transaction from the server 130. The acknowledgment may indicate that the transaction has begun. Alternatively, the acknowledgment may indicate that the transaction has been completed. In some embodiments, second user device 120 may receive a first acknowledgement when the transaction has begun and a second acknowledgment when the transaction has been completed.

Figure 6:
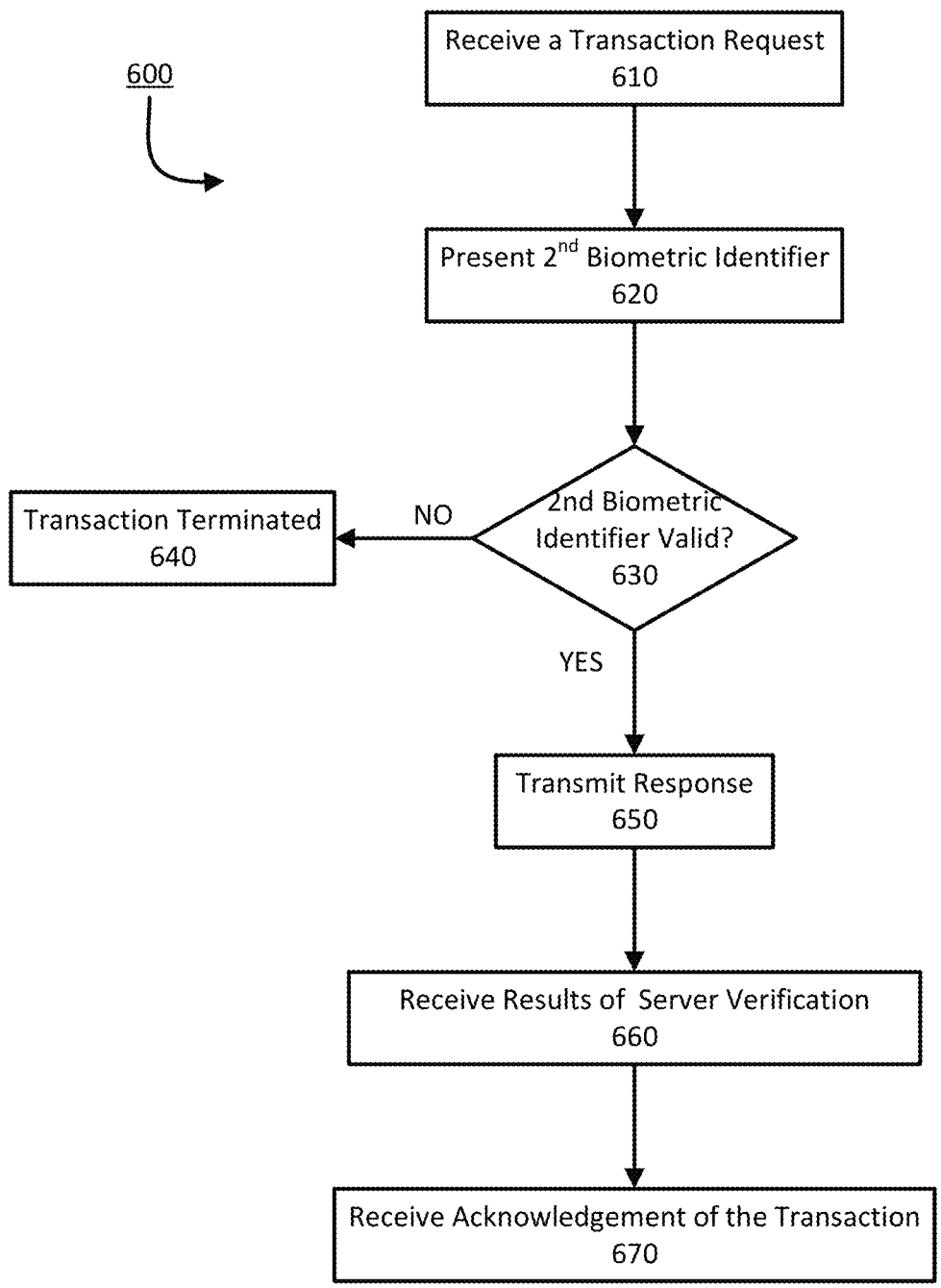
FIG. 6. shows a flowchart of a process for a first user device responding to a transaction request according to one or more aspects of the disclosure.

Turning to FIG. 6, a flow chart of a process 600 for responding to a transaction request according to one or more aspects of the disclosure is shown. In block 610, first user device 110 may receive a transaction request. As discussed above, the transaction request may be transmitted from server 130, on behalf of second user device 120, and include second additional information, such as the second biometric identifier, second metadata, the invoice, and the unique transaction identifier. In block 620, first user device may present the second biometric identifier. Presenting the second biometric identifier may include displaying a picture or video of the second user, displaying the second user's signature, or, alternatively, playing an audio clip that the second user recorded. In some embodiments, the first user device may verify a digital signature included with the invoice. In block 630, a determination may be made whether the second biometric identifier is valid. In this regard, the first user may deny the second biometric identifier. That is, the first user may indicate that he/she does not recognize the second biometric identifier as the second user. Accordingly, process 600 may proceed to block 640, and the transaction may be terminated. In some embodiments, first user device may transmit a response to second user device 120 that the transaction has been terminated. The response may include an indication that the authentication of the second biometric identifier at the first user device was unsuccessful.

In other instances, the first user may confirm that he/she recognizes the second biometric identifier as the second user. In these embodiments, process 600 may proceed to block 650 with the first user device transmitting a response to the transaction request to second user device, via server 130. As noted above, the response may include first additional information about the first user and first user device 110. In block 660, first user device 110 may receive the results of a server verification. As discussed above, server 130 may authenticate the first biometric identifier and the first metadata as an additional safeguard against unauthorized transactions. In block 670, first user device 110 may receive an acknowledgment with respect to the transaction. The acknowledgement may be received from server 130. Furthermore, the acknowledgment may indicate that the transfer of assets has begun. In some embodiments, the acknowledgment may indicate that the transfer has been completed. In further embodiments, first user device 110 may receive two acknowledgements: a first acknowledgement when the transfer has begun, and a second acknowledgment when the transfer has been completed.

Figure 7A:
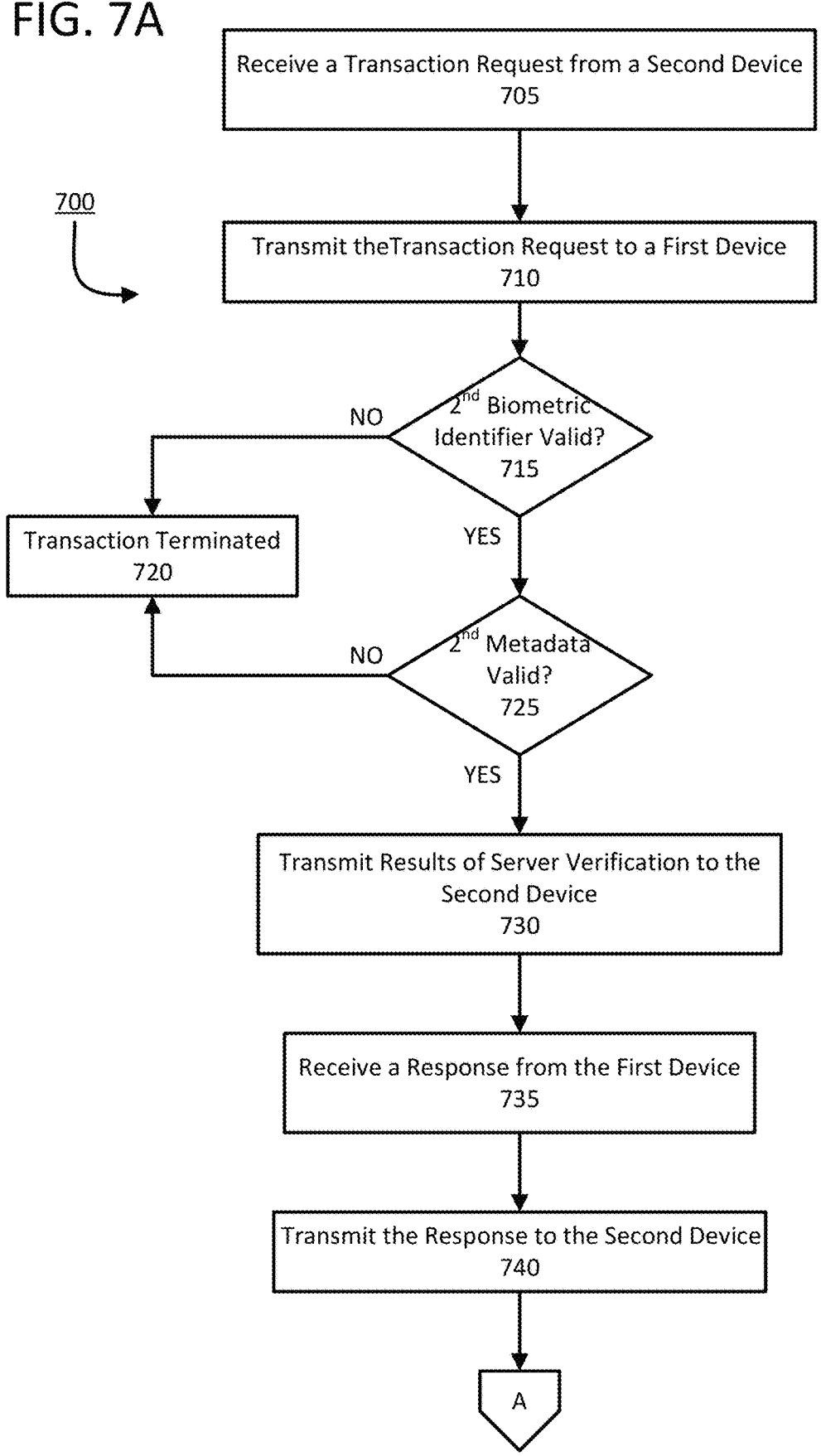
FIGS. 7A and 7B show a flowchart of a process for a server handling the transaction between the first user device and the second user device according to one or more aspects of the disclosure.
Figure 7B:
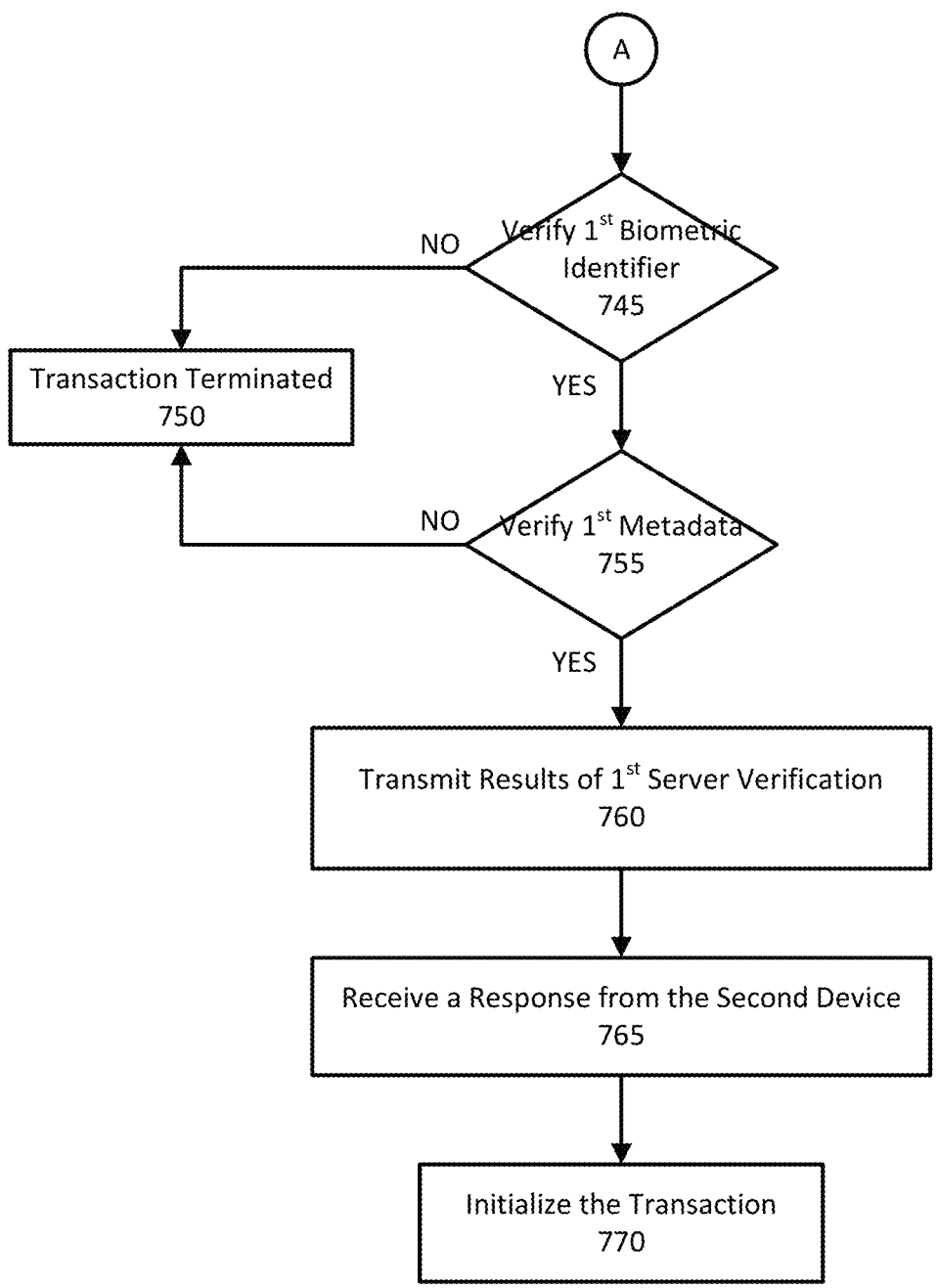

As described above, server 130 may perform a more active role in facilitating the transaction between the first user device and second user device. In this regard, server 130 may authenticate and/or verify one or more factors related to each user device as part of the transaction. FIG. 7 shows a flowchart of a process for a server handling the transaction between the first user device and the second user device according to one or more aspects of the disclosure.

In block 705, server 130 may receive a transaction request from second user device 120. The transaction request may include second additional information including, for example, a second biometric identifier, second metadata, and an invoice. In block 710, server 130 may transmit the transaction request to first user device 110. The transaction request may include some, or all, of the second additional information provided by second user device 120.

In block 715, server 130 may verify the second biometric identifier received in the transaction request. In this regard, the second biometric identifier may be compared to the biometric identifier provided by the second user when the second user created his/her account. When the second biometric identifier is not valid, process 700 proceeds to block 720, where server 130 may terminate the transaction. However, when the second biometric identifier is valid, process 700 may proceed to block 725, where the second metadata included in the transaction request may be verified. Similar to verifying the second biometric identifier, second metadata may be compared to metadata registered by the second user during account creation. When the second metadata does not match the registered metadata, server 130 may terminate the transaction in block 720. When the second metadata matches the registered metadata, process 700 proceeds to block 730, where the results of the server verification may be transmitted to the second device. In some embodiments, one or both of the server verification steps may be skipped. In these embodiments, server 130 may rely on the mutual authentication of the exchanged biometric identifiers to initialize the transaction.

In block 735, server 130 may receive a response from first user device 110. As noted above, the response may be a rejection of the second biometric identifier. This may terminate the transaction. Alternatively, the response from first user device 110 may verify the second biometric identifier. In this regard, the response may include the verification of the second biometric identifier, a first biometric identifier of the first user, and first metadata. In block 740, server 130 may transmit the response received from first user device 110 to second user device 120.

In block 745, server 130 may verify the first biometric identifier received in the response from first user device 110. In this regard, the first biometric identifier may be compared to the biometric identifier provided by the first user when the first user created his/her account. When the first biometric identifier is not valid, process 700 proceeds to block 750, where server 130 may terminate the transaction. However, when the first biometric identifier is valid, process 700 may proceed to block 755, where the first metadata included in the response may be verified. Similar to verifying the first biometric identifier, first metadata may be compared to metadata registered by the first user while he/she was creating his/her account. When the first metadata does not match the registered metadata, server 130 may terminate the transaction in block 750. When the first metadata matches the registered metadata, process 700 proceeds to block 760, where the results of the server verification may be transmitted to the first user device. The server verification steps may be skipped in some embodiments, relying, instead, on the mutual authentication of the exchanged biometric identifiers to initialize the transaction.

Figure 8:
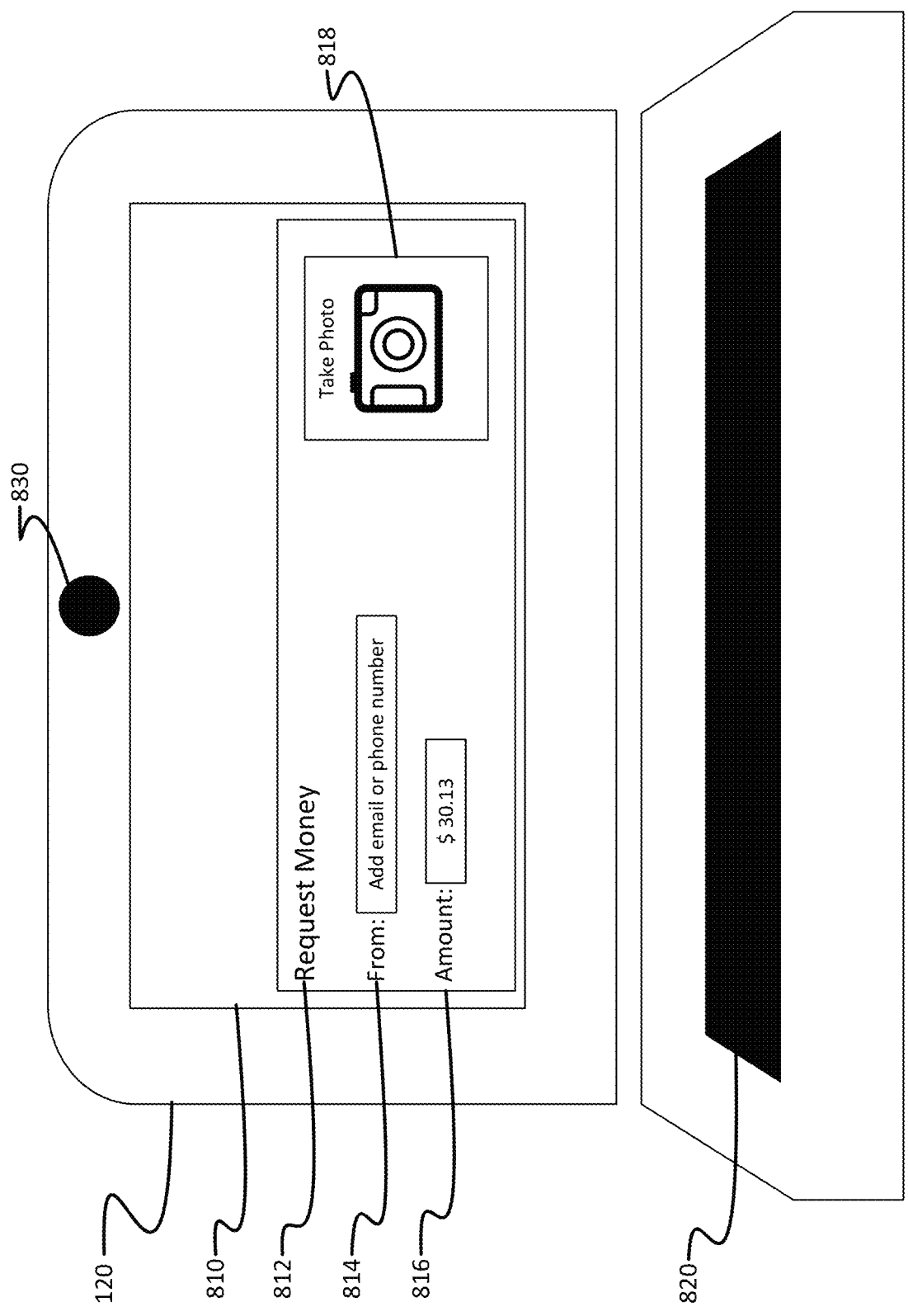
FIG. 8 shows an example of initiating a transaction at a second user device according to one or more aspects of the disclosure.

In block 765, server 130 may receive a response from second user device 120 indicating the result of the second user's verification of the first biometric identifier. The response from the second user device may be a rejection of the first biometric identifier, which may terminate the transaction. Alternatively, the response may verify the first biometric identifier. In response to receiving a verification of the first biometric identifier from the second user device, server 130 may initialize the transaction between the two user devices in block 770. As noted above, this may include the application on the second user device receiving funds or assets from the application on the first user device. Alternatively, the application on the second user device may send funds or assets to the application on the first user device As discussed above, there are several ways that a user may initialize a transaction. For example, a user may initialize the transaction from an application located on their device or via a website. FIG. 8 shows an example of initiating a transaction at a second user device according to one or more aspects of the disclosure. In this regard, FIG. 8 illustrates second user device 120 that includes a display 810, a keyboard 820, and image capture device 830. Second user device 120 may also include a microphone (not shown). Display 810 may display a request money page 812. Request money page 812 may be part of an application executing on second user device 110. Alternatively, request money page 812 may be a website that the second user accesses. Request money page 812 includes a from field 814, an amount field, and a biometric capture icon 818. From field 814 may allow the second user to specify the user from which to request money. From field 814 may allow the second user to enter a username, a mobile phone number, an email address, or some other identifier of the first user. Amount field 816 may allow the user to specify the amount requested from the first user. Biometric capture icon 818 may allow the second user to capture the second biometric identifier that is sent to the first user as part of the two-way handshake verification process. Biometric capture icon 818 may activate image capture device 830 to obtain a photo or video of the second user. As part of the process, a timestamp may be associated with the photo or video to ensure that the second biometric identifier is recent and a malicious user is not using an older image or video of the second user. While biometric capture icon 818 shows a camera to obtain a photo or video, it will be appreciated that biometric capture icon 818 may allow the second user to obtain a voiceprint, fingerprint, retina scan, or any other suitable biometric identifier.

Figure 9:
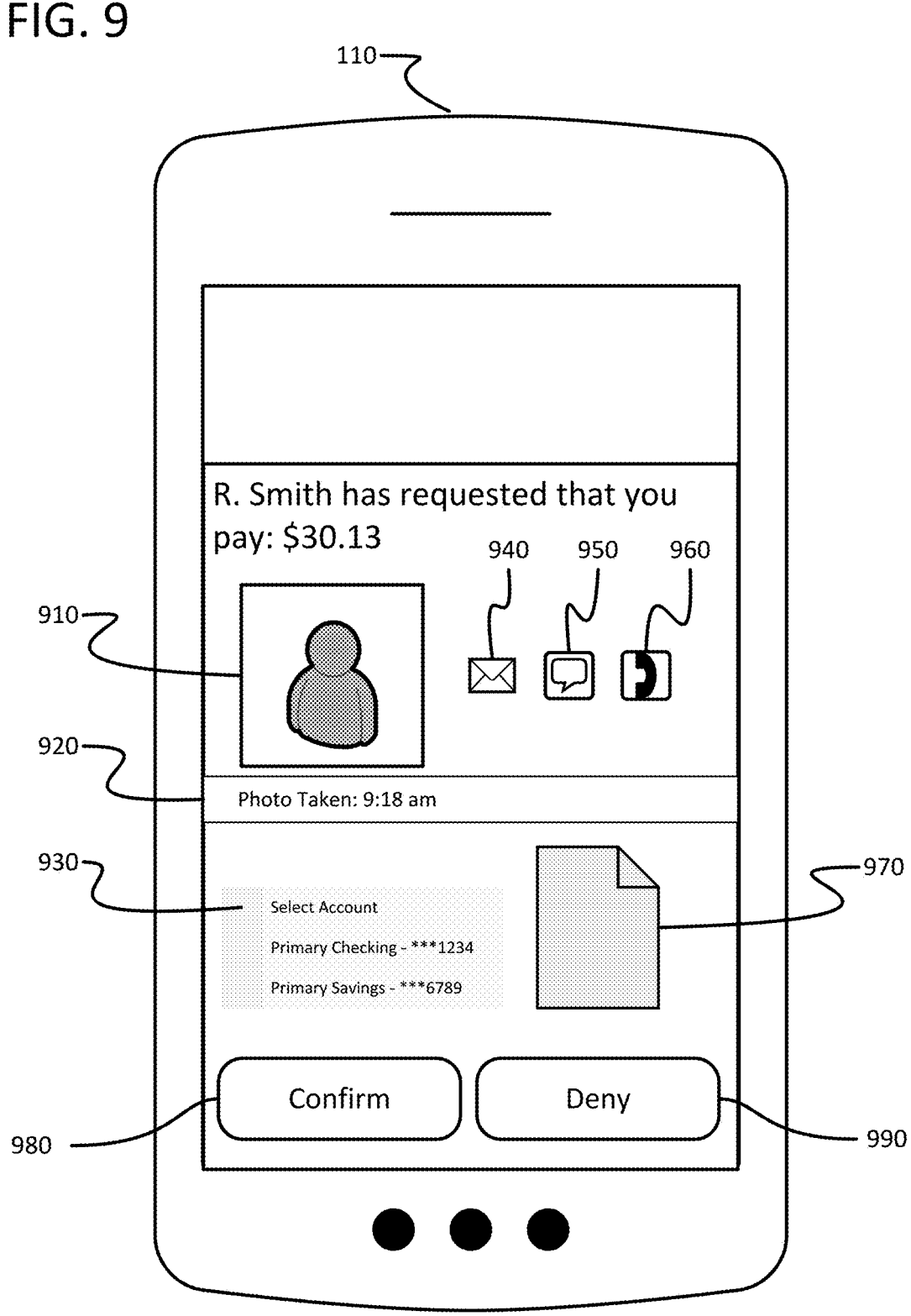
FIG. 9 shows an example of responding to a transaction request at a first user device according to one or more aspects of the disclosure.

Once the transaction is initialized, the users involved in the transaction may perform a two-way handshake in which biometric identifiers of the other user may be verified. FIG. 9 shows an example of responding to a transaction request at a first user device according to one or more aspects of the disclosure. FIG. 9 illustrates first user device 110, which may present an interface for responding to the transaction. The interface may state that the second user ("R. Smith") has requested an amount from the first user. The interface may include second biometric identifier 910, a timestamp 920 of second biometric identifier 910, a dropdown 930, an email icon 940, a messaging icon 950, a call icon 960, a file 970 (e.g., the invoice), a confirm button 980, and a deny button 990. Dropdown 930 may allow the first user to select an account from which to pay the second user. Email icon 940 may allow the first user to send the second user an email. Similarly, messaging icon 950 and call icon 960 may allow the first user to text message or call the second user respectively. File 970 may be an invoice, or some other artifact, that reflects the reason why the second user is requesting money from the first user. Confirm button 980 may be selected by the first user when the first user recognizes the second biometric identifier provided by the second user. Similarly, deny button 990 may be selected when the first user does not recognize the second biometric identifier. In some embodiments, first user may select deny button 990 if timestamp 920 indicates that the second biometric identifier was not obtained recently (e.g., within 30 minutes of the request).

The methods and systems as described above may secure electronic transactions by employing two-way handshakes to allow users to verify the identity of the party they are transacting with prior to the exchange of any assets. Additional security may be realized by having an intermediary server verify metadata associated with each device and the biometric identifiers supplied by each user. By including authentication of biometric identifiers, and the optional server verification of metadata and the biometric identifiers, electronic transaction security may be improved and scammers may be prevented from fraudulently obtaining assets from users.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computing devices) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A computer-implemented method comprising:
   transmitting, from a first device to a second device, a request for an electronic transfer of assets, wherein the request comprises a first biometric identifier of a user of the first device and a timestamp associated with the first biometric identifier;
   receiving, from the second device, a response to the request for the electronic transfer of assets, wherein the response comprises verification of the first biometric identifier and a second biometric identifier of a user of the second device;
   causing, by the first device, the second biometric identifier to be presented to the user of the first device;
   receiving, by the first device and based on a determination that a second timestamp associated with the second biometric identifier is within a predetermined threshold, verification of the second biometric identifier; and
   receiving, in an account associated with the first device and based on the verification of the second biometric identifier, the assets.

2. The computer-implemented method of claim 1, comprising:
capturing the first biometric identifier of the user of the first device before transmitting the first biometric identifier with the request for the electronic transfer of assets.

3. The computer-implemented method of claim 1, comprising:
generating a digital signature; and
sending the digital signature with the request for the electronic transfer of assets.

4. The computer-implemented method of claim 1, wherein the request for the electronic transfer of assets comprises at least one of: an invoice or an artifact.

5. The computer-implemented method of claim 1, wherein the assets comprise at least one of: a fiat currency, a cryptocurrency, a stock, an option, a bond, a mutual fund, or an exchange traded fund.

6. The computer-implemented method of claim 1, wherein the first biometric identifier comprises at least one of:
a photograph of the user of the first device;
a video of the user of the first device;
a voiceprint of the user of the first device; or
a signature of the user of the first device.

7. The computer-implemented method of claim 1, wherein the request for the electronic transfer of assets further comprises metadata.

8. The computer-implemented method of claim 7, comprising:
receiving, from a server, an acknowledgment authenticating the metadata associated with the first device.

9. The computer-implemented method of claim 1, wherein the account comprises a digital wallet.

10. A first computing device comprising:
one or more processors;
memory storing instructions that, when executed by the one or more processors, cause the first computing device to:
transmit, to a second computing device, a request for an electronic transfer of assets, wherein the request comprises a first biometric identifier of a user of the first computing device and a timestamp associated with the first biometric identifier;
receive, from the second computing device, a response to the request for the electronic transfer of assets, wherein the response comprises verification of the first biometric identifier and a second biometric identifier of a user of the second computing device;
cause the second biometric identifier to be presented to the user of the first computing device;
receive, based on a determination that a second timestamp associated with the second biometric identifier is within a predetermined threshold, verification of the second biometric identifier; and
receive, in an account associated with the first computing device and based on the verification of the second biometric identifier, the assets.

11. The first computing device of claim 10, further comprising:
an input device configured to capture the first biometric identifier.

12. The first computing device of claim 11, wherein the input device comprises at least one of: an image capture device or a microphone.

13. The first computing device of claim 10, wherein the instructions, when executed by the one or more processors, cause the first computing device to:
establish a secure communication channel prior to transmitting the request for the electronic transfer of assets.

14. The first computing device of claim 10, wherein the instructions to transmit the request for the electronic transfer of assets cause the first computing device to send, to the second computing device, at least one of: a push notification, an email notification, or a text notification.

15. The first computing device of claim 10, wherein the instructions to cause the second biometric identifier to be presented to the user of the first computing device cause the first computing device to:
display the second biometric identifier to the user of the first computing device, wherein the second biometric identifier comprises at least one of: an image or a video.

16. The first computing device of claim 10, further comprising:
one or more inputs configured to receive an input associated with the verification of the second biometric identifier.

17. The first computing device of claim 10, wherein the assets comprise at least one of: a fiat currency, a cryptocurrency, a stock, an option, a bonds, a mutual fund, or an exchange traded fund.

18. The first computing device of claim 10, wherein the account comprises a digital wallet.

19. The first computing device of claim 10, wherein the instructions, when executed by the one or more processors, cause the first computing device to:
receive, from a server, a notification that a transaction has been completed, wherein the transaction is associated with a unique identifier.

20. A non-transitory computer-readable medium comprising instructions that, when executed, cause a first computing device to:
transmit, to a second computing device, a request for an electronic transfer of assets, wherein the request comprises a first biometric identifier of a user of the first computing device and a timestamp associated with the first biometric identifier;
receive, from the second computing device, a response to the request for the electronic transfer of assets, wherein the response comprises verification of the first biometric identifier and a second biometric identifier of a user of the second computing device;
cause the second biometric identifier to be presented to the user of the first computing device;
receive, based on a determination that a second timestamp associated with the second biometric identifier is within a predetermined threshold, verification of the second biometric identifier; and
receive, in an account associated with the first computing device and based on the verification of the second biometric identifier, the assets.

21. The non-transitory computer-readable medium claim 20, wherein the instructions, when executed, cause the first computing device to:
establish a secure communication channel prior to transmitting the request for the electronic transfer of assets.

22. The non-transitory computer-readable medium of claim 20, wherein the instructions to transmit the request for the electronic transfer of assets cause the first computing device to send, to the second computing device, at least one of: a push notification, an email notification, or a text notification.

23. The non-transitory computer-readable medium of claim 20, wherein the instructions to cause the second biometric identifier to be presented to the user of the first computing device cause the first computing device to:
    display the second biometric identifier to the user of the first computing device, wherein the second biometric identifier comprises at least one of: an image or a video.

24. The non-transitory computer-readable medium of claim 20, wherein the instructions, when executed, cause the first computing device to:
    receive, from a server, a notification that a transaction has been completed, wherein the transaction is associated with a unique identifier.

* * * * *